(12) United States Patent
Siebens

(10) Patent No.: US 8,616,908 B2
(45) Date of Patent: Dec. 31, 2013

(54) ELECTRICAL CONNECTOR WITH A CAP WITH A SACRIFICIAL CONDUCTOR

(75) Inventor: Larry N. Siebens, Asbury, NJ (US)

(73) Assignee: Thomas & Betts International, Inc., Wilmington, DE (US)

( * ) Notice: Subject to any disclaimer, the term of this patent is extended or adjusted under 35 U.S.C. 154(b) by 50 days.

(21) Appl. No.: 13/461,922

(22) Filed: May 2, 2012

(65) Prior Publication Data

US 2012/0214336 A1    Aug. 23, 2012

Related U.S. Application Data

(63) Continuation-in-part of application No. 13/038,955, filed on Mar. 2, 2011, now Pat. No. 8,172,596.

(60) Provisional application No. 61/309,919, filed on Mar. 3, 2010.

(51) Int. Cl.
*H01R 13/62*    (2006.01)

(52) U.S. Cl.
USPC .......................................................... 439/301

(58) Field of Classification Search
USPC ..................... 439/301–304, 88–89
See application file for complete search history.

(56) References Cited

U.S. PATENT DOCUMENTS

| | | | |
|---|---|---|---|
| 1,902,617 A | 3/1933 | Burr | |
| 2,937,359 A | 5/1960 | Cronin et al. | |
| 3,343,153 A | 9/1967 | Waehner | |
| 3,390,331 A | 6/1968 | Brown et al. | |
| 3,980,374 A | 9/1976 | Fallot | |
| 4,721,355 A * | 1/1988 | Gould | 385/76 |
| 4,760,327 A | 7/1988 | Walsh et al. | |
| 4,794,331 A | 12/1988 | Schweitzer, Jr. | |
| 4,904,932 A | 2/1990 | Schweitzer, Jr. | |
| 4,915,641 A * | 4/1990 | Miskin et al. | 439/247 |
| 4,946,393 A | 8/1990 | Borgstrom et al. | |
| 5,367,251 A | 11/1994 | McTigue | |
| 6,210,206 B1 | 4/2001 | Durham | |
| 6,332,785 B1 | 12/2001 | Muench, Jr. et al. | |
| 6,843,685 B1 | 1/2005 | Borgstrom et al. | |
| 7,150,098 B2 | 12/2006 | Borgstrom et al. | |
| 7,154,281 B2 | 12/2006 | Piesinger | |
| 7,288,718 B2 | 10/2007 | Stepniak et al. | |
| 7,503,785 B2 * | 3/2009 | Stepniak | 439/187 |
| 7,898,356 B2 * | 3/2011 | Sherrer et al. | 333/34 |
| 8,408,925 B2 * | 4/2013 | Borgstrom et al. | 439/181 |
| 2005/0272294 A1 * | 12/2005 | Ostendorp | 439/301 |
| 2006/0246761 A1 * | 11/2006 | Ostendorp | 439/301 |
| 2009/0029582 A1 * | 1/2009 | Nguyen et al. | 439/301 |
| 2009/0181567 A1 * | 7/2009 | Stockton et al. | 439/271 |

* cited by examiner

*Primary Examiner* — Chandrika Prasad
(74) *Attorney, Agent, or Firm* — Snyder, Clark, Lesch & Chung, LLP

(57) ABSTRACT

An electrical connector assembly may include a connector body for receiving a power cable and having at least one T-end having a bore therein. An adapter is configured to be received within the bore in the at least one T-end, wherein the adapter comprises a conductive core coupled to the power cable. A sacrificial cap is configured to engage a portion of the adapter extending from the at least one T-end. The sacrificial cap comprises a sacrificial conductor that is coupled to the conductive core of the adapter and configured to be cut through to confirm that the electrical connector assembly has been de-energized.

20 Claims, 11 Drawing Sheets

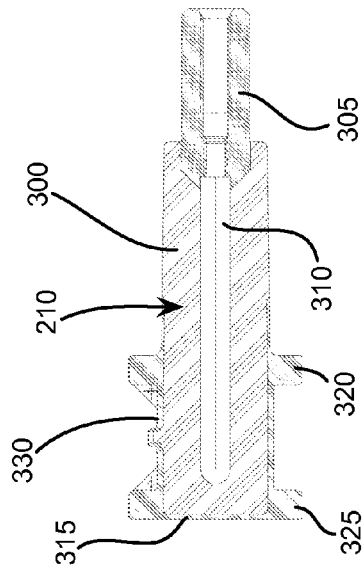
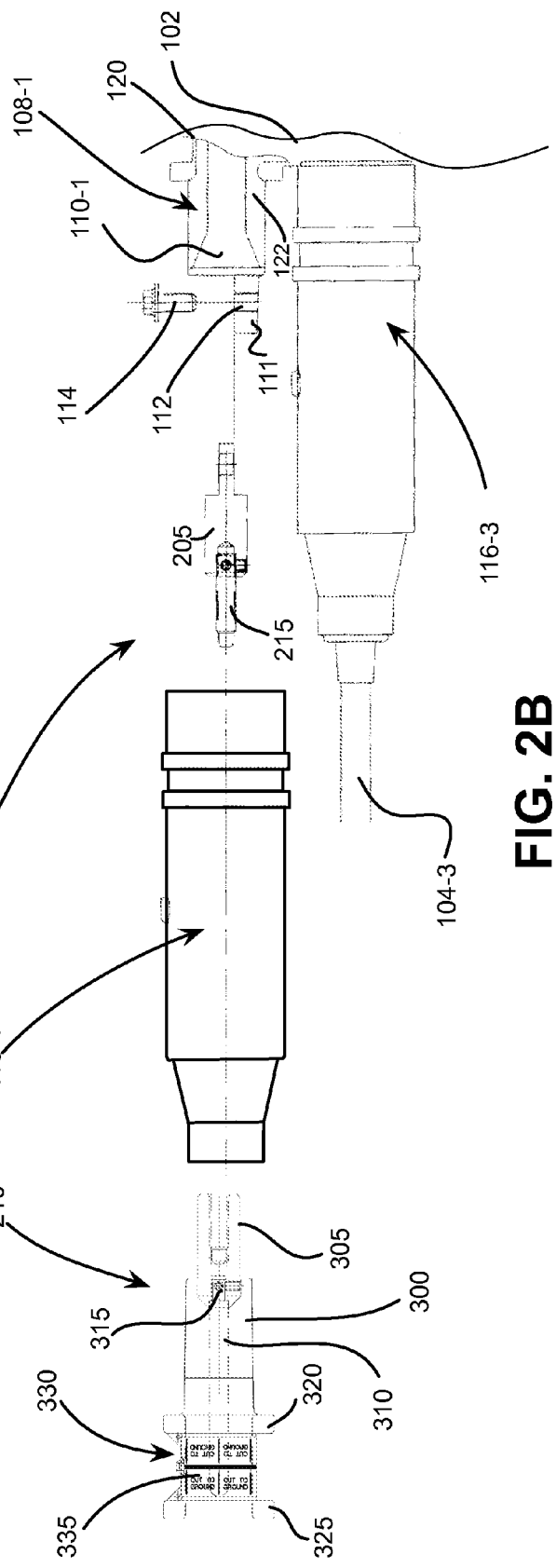
FIG. 3
FIG. 2B

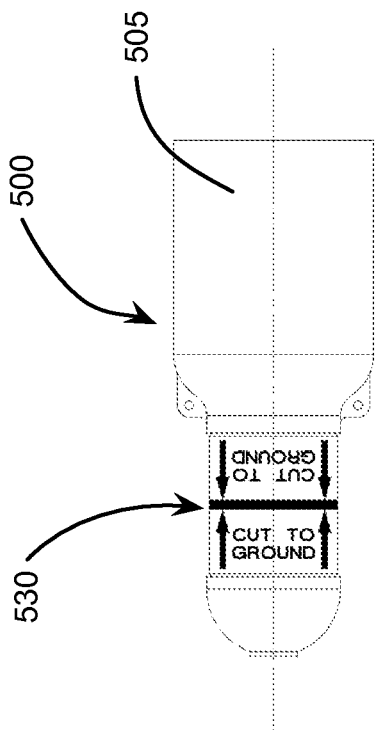
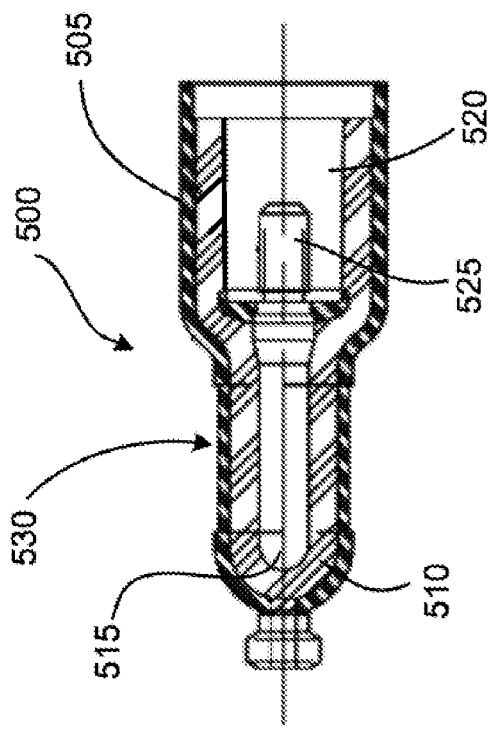
FIG. 5A
FIG. 5B

US 8,616,908 B2

ELECTRICAL CONNECTOR WITH A CAP WITH A SACRIFICIAL CONDUCTOR

CROSS-REFERENCE TO RELATED APPLICATIONS

This application is a continuation-in-part application of U.S. patent application Ser. No. 13/038,955, filed Mar. 2, 2011, which is a non-provisional application claiming priority under 35. U.S.C. §119, based on U.S. Provisional Patent Application No. 61/309,919 filed Mar. 3, 2010, the disclosures of which are hereby incorporated by reference herein.

BACKGROUND OF THE INVENTION

The present invention relates to electrical cable connectors, such as splicing connectors for joining two or more electrical cables, loadbreak connectors, and deadbreak connectors. More particularly, aspects described herein relate to an electrical cable connector that includes a feature for enabling personnel to ensure that the connector is de-energized.

High and medium voltage electrical connectors and components typically operate in the 15 to 35 kilovolt (kV) range. Because such voltages are potentially very dangerous, it is typically necessary for personnel to confirm that the power is disconnected before commencing work or repair. Known methods of visual or physical de-energizing confirmation include "spiking the cable," in which a grounded spike is driven thru the cable and into the conductor or a grounded hydraulic cable cutter is used to physically cut the cable in half.

Unfortunately, after a cable is "spiked," the utility is required to replace the cable or increase its length by adding a splice and additional cable in order to reconnect to the system. This is costly and time consuming.

BRIEF DESCRIPTION OF THE DRAWINGS

FIG. 2B illustrates the power cable splicing connector of FIG. 2A in an exploded (e.g., unassembled) view;

FIG. 3 is a cross-sectional view of the sacrificial adapter of FIGS. 2A and 2B;

FIG. 5A is a cross-sectional view of an alternative sacrificial appendage for use with the splicing connector of FIGS. 4A and 4B;

FIG. 5B is side view of the alternative sacrificial appendage of FIG. 5A;

DETAILED DESCRIPTION OF THE PREFERRED EMBODIMENTS

The following detailed description refers to the accompanying drawings. The same reference numbers in different drawings may identify the same or similar elements.

Figure 1A:
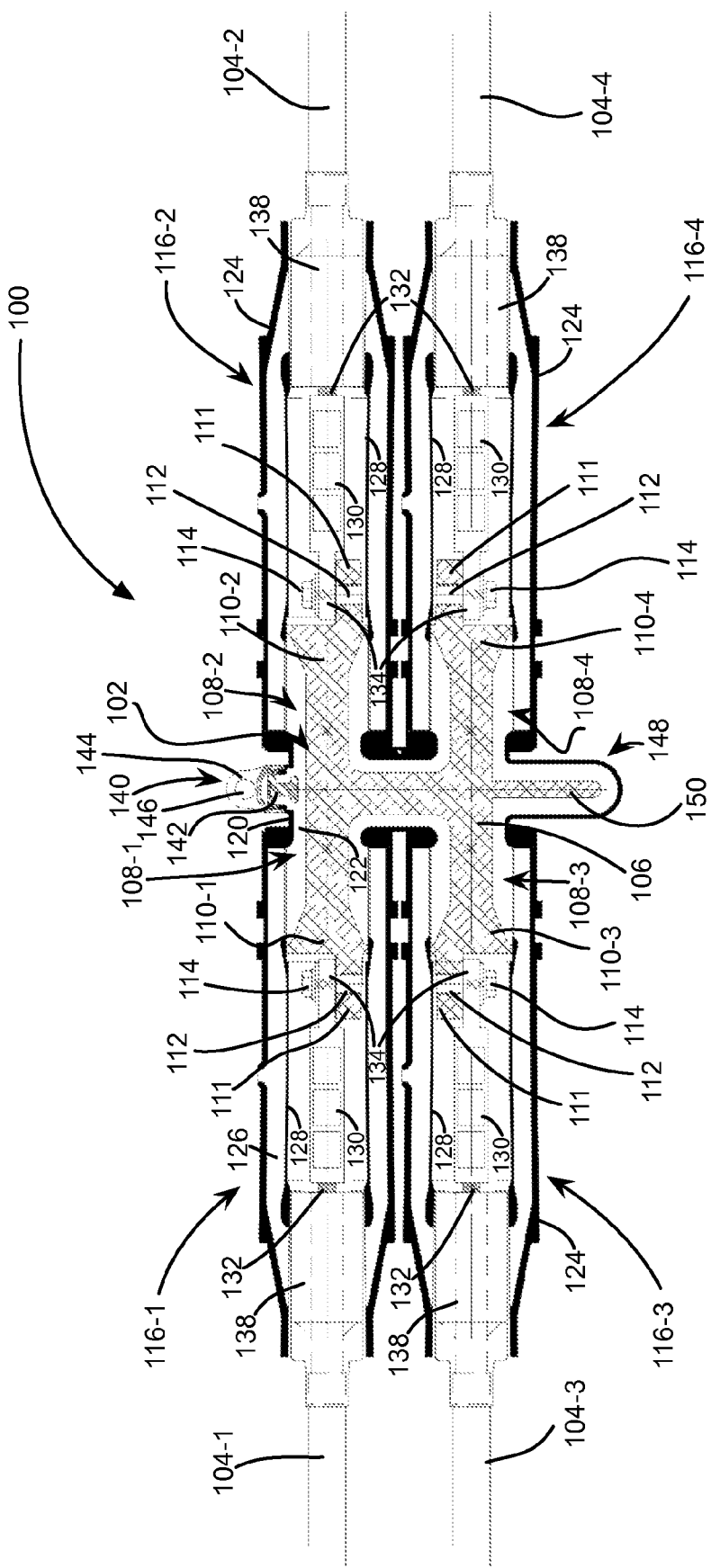
FIG. 1A is a schematic cross-sectional diagram illustrating a power cable splicing connector consistent with implementations described herein.

FIG. 1A is a schematic cross-sectional diagram illustrating a power cable splicing connector 100 configured in a manner consistent with implementations described herein. As shown in FIG. 1, power cable splicing connector 100 may include a four-way yoke 102 for enabling connection of power cables 104-1, 104-2, 104-3, and 104-4 (collectively "power cables 104," and individually "power cable 104-$x$"). For example, power cable 104-1 may be a supply cable and cables 104-2 to 104-4 may be load cables. Other types of power cable splicing connectors may be configured in accordance with implementations described herein, such as three-way yoke connectors, two-way connectors, etc.

In one implementation, yoke 102 of power cable splicing connector 100 may include a central conductor 106 and number of splice openings 108-1 to 108-4 (collectively "splice openings 108," and individually "splice opening 108-$x$"). Central conductor 106 may be formed of a suitably conductive material, such as copper, aluminum, or other conductive alloy. Further, as shown in FIG. 1, central conductor 106 may include outwardly extending portions 110-1 to 110-4 (collectively "outwardly extending portion 110," and individually "outwardly extending portion 110-$x$") that project from respective splice openings 108-$x$. As described in additional detail below, central conductor 106 may connect each of power cables 104-$x$ to each other power cable 104-$x$, such that voltage applied to one cable is transferred to each other cable.

Outwardly extending portions 110 may be configured to receive connector portions of power cables 104. For example, each extending portion 110-$x$ may include a spade portion 111 having a threaded bore 112 therein for receiving a connector bolt 114. In one configuration, as illustrated in FIG. 1, outwardly extending portion 110-1 extends oppositely from outwardly extending portion 110-2 and outwardly extending portion 110-3 extends oppositely from outwardly extending portion 110-4. Furthermore, outwardly extending portions 110-1 and 110-2 may be oriented parallel to outwardly extending portions 110-3 and 110-4, respectively. Such a configuration may provide for compact splicing or splitting of a power supply cable (e.g., cable 104-1) to multiple load cables (e.g., cables 104-2 to 104-4).

As shown in FIG. 1A, each splice opening 108-$x$ includes a cable receptacle interface that includes a substantially cylindrical flange or cuff portion configured to frictionally engage a cable receptacle 116-$x$ (individually, cable receptacle 116-$x$, or collectively, cable receptacles 116). For example, an inside diameter of a forward end of cable receptacle 116-$x$ may be sized to frictionally engage the cuff portion of splice opening 108-$x$. Each cable receptacle 116 be substantially cylindrical and may be configured to surround and protect an interface between power cables 104 and extending portions 110.

Yoke 102 may include an outer shield 120 formed from, for example, a peroxide-cured synthetic rubber, commonly referred to as EPDM (ethylene-propylene-dienemonomer). Within shield 120, yoke 102 may include an insulative inner housing 122, typically molded from an insulative rubber or epoxy material. Central conductor 106 may be enclosed within insulative inner housing 122.

Regarding cable receptacles 116, each cable receptacle 116-x may include an EPDM outer shield 124 and an insulative inner housing 126, typically molded from an insulative rubber or epoxy material. Cable receptacle 116-x further includes a conductive or semi-conductive insert 128 having a bore therethrough. Upon assembly, cable receptacle 116 surrounds the interface between power cable 104-x and extending portion 110-x. In one implementation, a forward end of insert 128 may be configured to frictionally engage outwardly extending portion 110-x of central conductor 106 upon assembly of splicing connector 100, thereby ensuring the electrical integrity of splicing connector 100.

Referring to power cables 104, a forward end of each power cable 104-x may be prepared by connecting power cable 104 to a crimp connector 130. Crimp connector 130 may include a substantially cylindrical assembly configured to receive a cable conductor 132 of power cable 104-x therein. During preparing of power cable 104-x, a portion of crimp connector 130 may be physically deformed (e.g., crimped) to fasten crimp connector 130 to cable conductor 132. Crimp connector portion 130 may include a forward spade portion 134 configured to be securely fastened to a spade portion 111 of outwardly extending portion 110-x of central conductor 106. For example, forward spade portion 134 may include a bore (not shown) configured to align with bore 112 in spade portion 111. Connector bolt 114 may be inserted through the bore and into threaded bore 112 during assembly of splice connector 100.

As shown in FIG. 1A, each of the prepared power cables 104 may further include an adapter 138 disposed rearwardly relative to crimp connector 130. Adapter 138 may be affixed to power cable 104-x and may provide a frictional engagement with a rearward portion of cable receptacle 116-x. In one implementation, adapter 138 may be formed of an insulative material, such as rubber or epoxy.

In one exemplary implementation, power cable splicing connector 100 may include a voltage detection test point assembly 140 for sensing a voltage in splicing connector 100. Voltage detection test point assembly 140 may be configured to allow an external voltage detection device, to detect and/or measure a voltage associated with splicing connector 100.

For example, as illustrated in FIG. 1A, voltage detection test point assembly 140 may include a test point terminal 142 embedded in a portion of yoke inner housing 122 and extending through an opening within yoke outer shield 120. In one exemplary embodiment, test point terminal 142 may be formed of a conductive metal or other conductive material. In this manner, test point terminal 142 may be capacitively coupled to the electrical conductor elements (e.g., central conductor 106) within splicing connector 100.

Consistent with implementations described herein, a test point cap 144 may sealingly engage portion test point terminal 142 and outer shield 120. In one implementation, test point cap 144 may be formed of a semi-conductive material, such as EPDM compounded with conductive additives. When test point terminal 142 is not being accessed, test point cap 144 may be mounted on test point assembly 140. Because test point cap 144 is formed of a conductive or semi-conductive material, test point cap 144 may ground the test point when in position. Test point cap 144 may include an aperture 146 for facilitating removal of test point cap 144, e.g., using a hooked lineman's tool.

Consistent with implementations described herein, yoke 102 may include a sacrificial appendage 148 projecting therefrom. As shown in FIG. 1A, sacrificial appendage 148 may include a sacrificial conductor extension 150 projecting from central conductor 106. Portions of insulative inner housing 122 and outer housing 120 may be formed around sacrificial conductor extension 150. In one implementation, sacrificial appendage 148 may project substantially perpendicularly from outwardly extending portions 110, so as to be relatively free of encumbrances.

When it is necessary for work to be performed on any of power cables 104 (or devices connected to power cables 104), a worker may cut through sacrificial appendage 148 (e.g., with a hydraulic cable cutter, or similar tool) to ensure that the electrical system that splicing connector 100 is connected to has been properly de-energized and is, therefore, safe to work on. When it is time to re-energize splicing connector 100, yoke 102 may be replaced with a new yoke 102, having an intact sacrificial appendage 148.

Figure 1B:
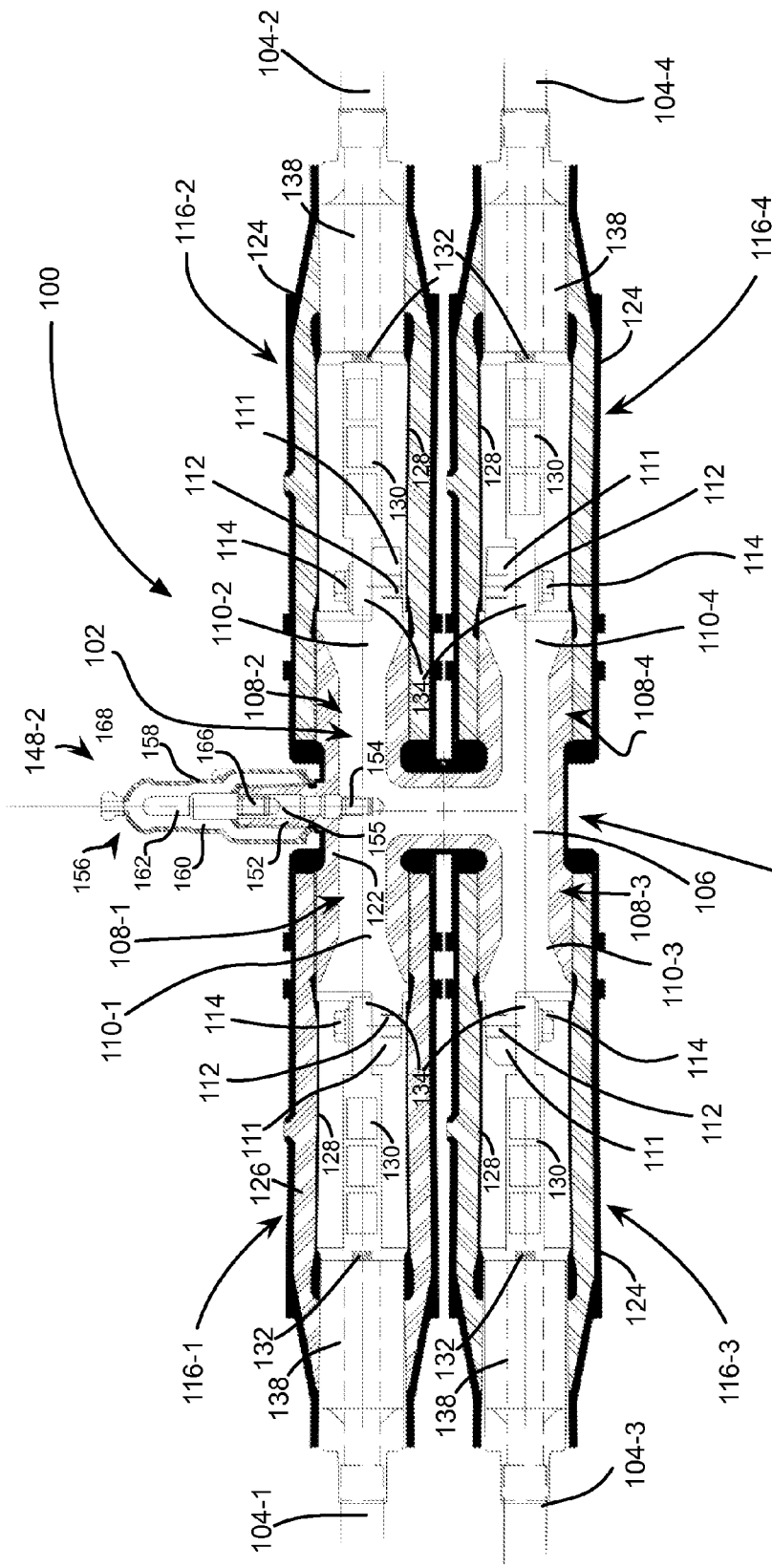
FIG. 1B is a schematic partial cross-sectional diagram illustrating a power cable splicing connector configured in a manner consistent with another implementation described herein.
Figure 1C:
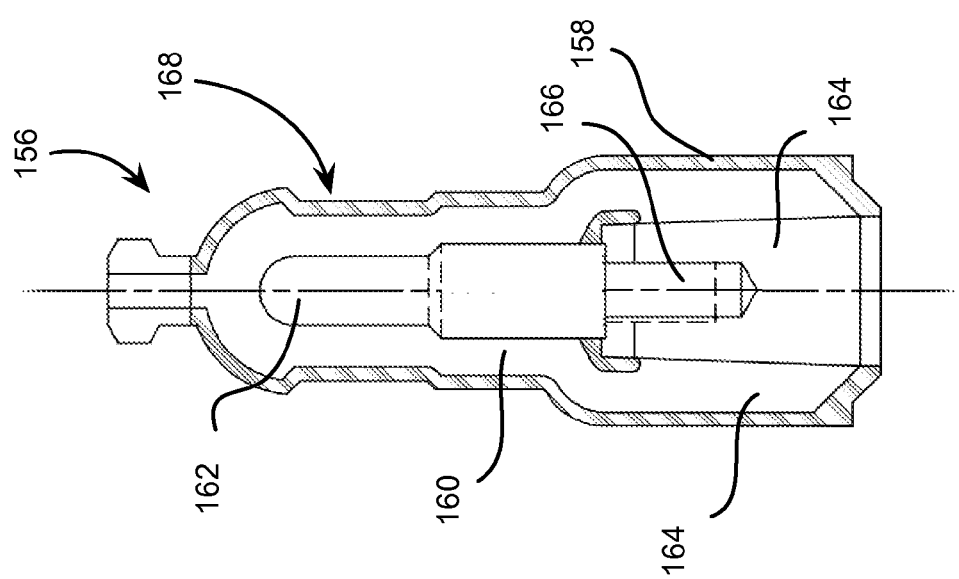
FIG. 1C is a cross-sectional diagram of the sacrificial cap of FIG. 1B.

FIG. 1B is a schematic partial cross-sectional diagram illustrating power cable splicing connector 100 configured in a manner similar to that described above with respect to FIG. 1A. FIG. 1C is a partial cross-sectional diagram illustrating the sacrificial cap of FIG. 1B. Where appropriate, FIGS. 1B and 1C use the same reference numbers to identify the same or similar elements.

As shown in FIGS. 1B and 1C, yoke 102 and the portions of cable splicing connector 100 associated with power cables 104-2 to 104-4 remain substantially similar to the embodiment describe above with respect to FIG. 1A. However, unlike the embodiment of FIG. 1A, sacrificial appendage 148 (referred to as element 148-2 in FIGS. 1B and 1C) may include a modular configuration configured for removable attachment and/or replacement on yoke 102.

As shown in FIG. 1B, yoke 102 may include a sacrificial appendage connection portion 152 projecting outwardly therefrom. In one implementation, sacrificial appendage connection portion 152 may be integrally formed with inner housing 122 and may include a contact 154 provided therein. Contact 154 may extend into a corresponding portion of central conductor 106, such as via a threaded bore provided in central conductor 106. Contact 154 may include a female thread 155 at an outer end thereof for receiving a sacrificial cap 156.

As shown in FIGS. 1B and 1C, sacrificial cap 156 may include an EPDM outer shield 158 and an insulative inner housing 160, typically molded from an insulative rubber or epoxy material. Sacrificial cap 156 may further include a sacrificial conductor 162 received within a rearward portion of inner housing 160. Furthermore, a forward portion of sacrificial cap 156 may include a cavity 164 therein (shown in FIG. 1C) for engaging a projecting portion of sacrificial appendage connection portion 152.

A forward portion of outer shield 158 and inner housing 160 may be configured to surround and protect an interface between sacrificial appendage connection portion 152 and sacrificial conductor 162. In one implementation, a forward end of outer shield 158 and inner housing 160 may be configured to frictionally engage a stepped or notched outer configuration of sacrificial appendage connection portion 152 upon assembly of splicing connector 100, thereby ensuring the electrical integrity of splicing connector 100.

Consistent with implementations described herein, sacrificial conductor 162 may include a conductive threaded male protrusion 166 extending axially therefrom. As described above, the projecting portion of contact 154 may include threaded female cavity 155. Male protrusion 166 may correspond to threaded female portion 155 in contact 154 to couple contact 154 to sacrificial conductor 162, thereby conductively connecting sacrificial conductor 162 to central conductor 106 of yoke 102. In other implementations, the male/female relationship may be reversed.

In one implementation, a cut-through region 168 may be provided in an outer portion of sacrificial cap 156 in a region overlying at least a portion of sacrificial conductor 162. In some implementations, indicia relating to cut-through region 168 may be provided on a surface of outer housing 158 for indicating that a user is to cut through sacrificial cap 156 at cut-through region 168.

When it is necessary for work to be performed on any of power cables 104 (or devices connected to power cables 104), a worker may cut through sacrificial cap 156 at cut-through region 168 (e.g., with a grounded hydraulic cable cutter, or similar tool) to ensure that electrical the system that splicing connector 100 is connected to has been properly de-energized and is, therefore, safe to work on. When it is time to reenergize splicing connector 100, the cut-through sacrificial cap 156 may be removed and a new or replacement sacrificial cap 156 may be installed.

Figure 2A:
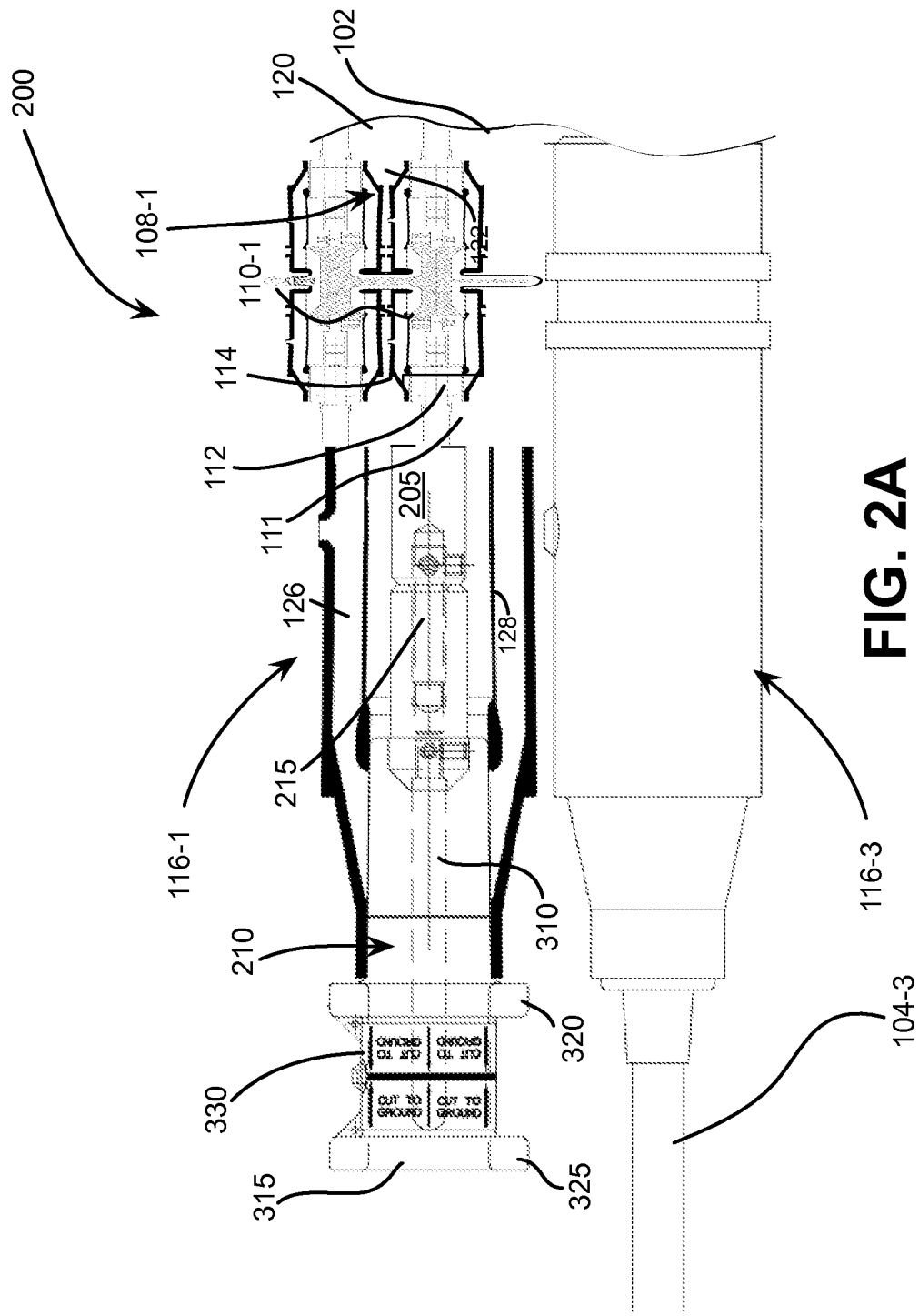
FIG. 2A is a schematic partial cross-sectional diagram illustrating a power cable splicing connector configured in a manner consistent with another implementation described herein.

FIG. 2A is a schematic partial cross-sectional diagram illustrating a power cable splicing connector 200 configured in a manner consistent with another implementation described herein. FIG. 2B illustrates power cable splicing connector 200 in an exploded (e.g., unassembled) view. Where appropriate, FIGS. 2A and 2B use the same reference numbers to identify the same or similar elements.

As shown in FIGS. 2A and 2B, yoke 102 and the portions of cable splicing connector 200 associated with power cables 104-2 to 104-4 remain substantially similar to the embodiment describe above with respect to FIG. 1A. However, unlike the embodiment of FIG. 1A, yoke 102 does not include a sacrificial appendage (e.g., appendage 148) extending therefrom. Rather, as described below, one of splice openings 108-1 to 108-4 (e.g., splice opening 108-1) and the corresponding outwardly extending portion 110 (e.g., extending portion 110-1) may be used to provide a sacrificial appendage or portion to splicing connector 200.

As shown in FIGS. 2A and 2B, a sacrificial adapter spade connector 205 may be connected to spade portion 111 of outwardly extending portion 110-1 via connector bolt 114. Sacrificial adapter spade connector 205 may be configured to provide a releasable attachment mechanism for connecting sacrificial adapter 210 to yoke 102. For example, sacrificial adapter spade connector 205 may include a conductive threaded male protrusion 215 extending axially therefrom in a rearward direction. As described below, sacrificial adapter 210 may include a correspondingly threaded female cavity for conductively securing sacrificial adapter 210 to male protrusion 215. In other implementations, the male/female relationship may be reversed. For example, sacrificial adapter spade connector 205 may include a female threaded cavity for receiving threaded male protrusion 215 extending from sacrificial adapter 210.

As shown in FIGS. 2A and 2B, cable receptacle 116-1 may surround spade extending portion 110-1, spade portion 111, and sacrificial adapter spade connector 205 in a manner similar to that described above with respect to FIG. 1A. For example, cable receptacle 116-1 be substantially cylindrical and may be configured to surround and protect an interface between power sacrificial cable adapter connector 205 and extending portion 110-1. Further, forward end of insert 128 in receptacle 116-1 may be configured to frictionally engage outwardly extending portion 110-1 upon assembly of splicing connector 200, thereby ensuring the electrical integrity of splicing connector 200.

FIG. 3 is a cross-sectional view of sacrificial adapter 210. As shown, sacrificial adapter 210 may have a substantially cylindrical configuration that includes an insulative adapter housing 300, a connector portion 305, a sacrificial bar 310, and a semi-conductive jacket 315. Insulative adapter housing 300 may be formed of, for example, EPDM and may be sized to frictionally engage rearward openings in outer shield 124 and inner insert 128 of cable receptacle 116-1.

Insulative adapter housing 300 may axially surround sacrificial bar 310 and a rearward portion of connector portion 305 so that, upon assembly, sacrificial bar 310 is electrically connected to central conductor 106 of yoke 102 (e.g., via sacrificial adapter spade connector 205). As described briefly above, connector portion 305 may include a threaded cavity therein for receiving threaded male protrusion 215 extending from sacrificial adapter spade connector 205.

Semi-conductive jacket 315 may be formed about a rearward portion of insulative adapter housing 300, such that a portion of sacrificial adapter 210 extending from cable receptacle 116-1 is encased in semi-conductive jacket 315, thereby ensuring electrical continuity on an outer surface of splicing connector 200. As shown in FIGS. 2A-3, semi-conductive jacket 315 may include forward and rearward annular shoulder portions 320 and 325, and a central cut-through portion 330.

In one implementation, forward and rearward annular shoulder portions 320/325 may radially project from a central axis of sacrificial adapter 210 and may provide a means with which to insert sacrificial adapter 210 into cable receptacle 116-1. In addition, as shown in FIG. 2A, forward annular shoulder portion 320 may provide a stop against receptacle 116-1, cut-through portion 330 may be provided in a region between forward annular shoulder portion 320 and rearward annular shoulder portion 325 and may be provided in a region overlying at least a portion of sacrificial bar 310. In some implementations, cut-through portion 330 may be provided with indicia 335 for indicating that a user is to cut through sacrificial adapter 210 at cut-through portion 330.

When it is necessary for work to be performed on any of power cables 104 (or devices connected to power cables 104), a worker may cut through sacrificial adapter 210 at cut-through portion 330 (e.g., with a grounded hydraulic cable cutter, or similar tool) to ensure that the electrical system that splicing connector 200 is connected to has been properly de-energized and is, therefore, safe to work on. When it is time to re-energize splicing connector 200, the cut-through sacrificial adapter 210 may be removed and a new or replacement sacrificial adapter 210 may be installed.

Figure 4A:
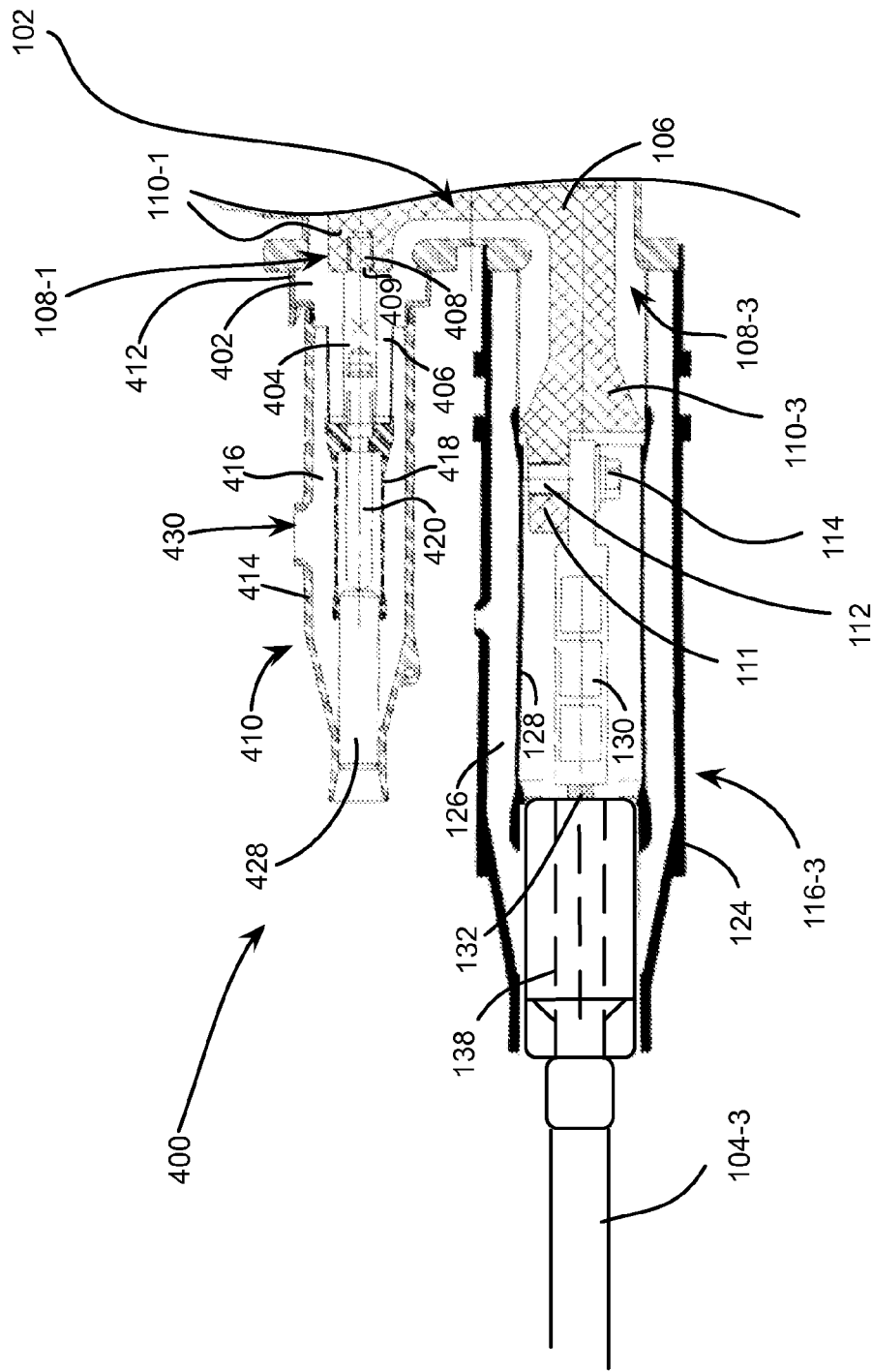
FIG. 4A is a schematic partial cross-sectional diagram illustrating a power cable splicing connector configured in a manner consistent with yet another implementation described herein.
Figure 4B:
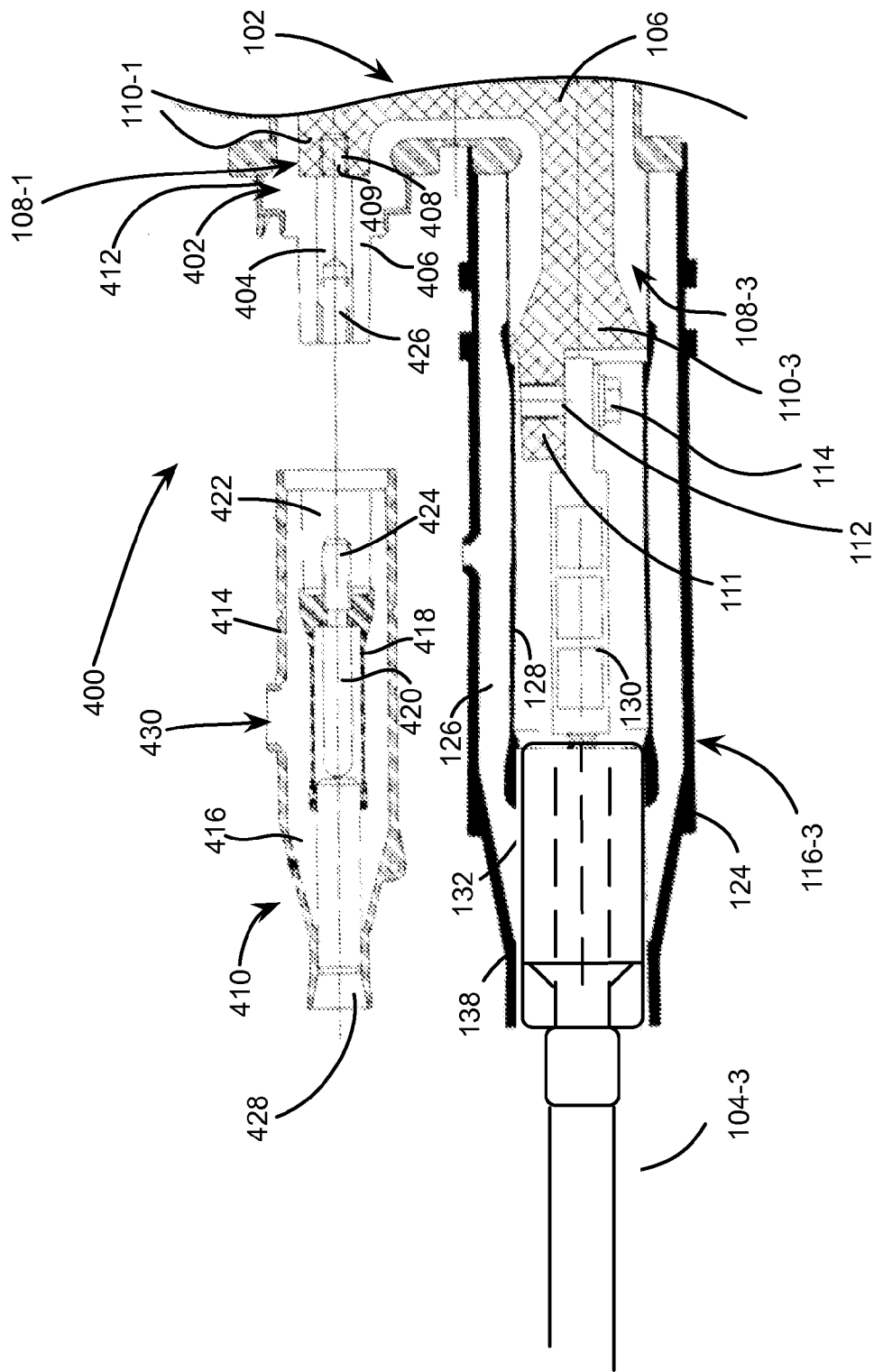
FIG. 4B illustrates the power cable splicing connector of FIG. 4A in an exploded (e.g., unassembled) view.

FIG. 4A is a schematic partial cross-sectional diagram illustrating a power cable splicing connector 400 configured in a manner consistent with yet another implementation described herein. FIG. 4B illustrates power cable splicing connector 400 in an exploded (e.g., unassembled) view. Where appropriate, FIGS. 4A and 4B use the same reference numbers to identify the same or similar elements.

As shown in FIGS. 4A and 4B, yoke 102 and the portions of cable splicing connector 400 associated with power cables 104-2 to 104-4 remain substantially similar to the embodiment described above with respect to FIG. 1A. However, unlike the embodiment of FIG. 1A, yoke 102 does not include a sacrificial appendage extending therefrom. Rather, as described below, one of splice openings 108-1 to 108-4 (e.g., splice opening 108-1) and the corresponding outwardly extending portion 110 (e.g., extending portion 110-1) may be used to provide a sacrificial portion for splicing connector 200.

As shown in FIGS. 4A and 4B, outwardly extending portion 110-1 may include a sacrificial interface 402 connected thereto. Sacrificial interface 402 may include a conductor portion 404 and an insulative portion 406. In one implementation, conductor portion 404 may be conductively coupled to extending portion 110-1, such as via a threaded engagement between conductor portion 404 and outwardly extending portion 110-1 of central conductor 106. For example, extending portion 110-1 may be provided with a female threaded cavity 408 and a forward portion of conductor portion 404 of sacrificial interface 402 may be provided with a corresponding male threaded portion 409. In other implementations, the male/female relationship may be reversed.

Insulative portion 406 of sacrificial interface 402 may radially surround conductor portion 404. As shown, in one implementation, insulative portion 406 may include a stepped outer configuration for sealingly receiving a sacrificial receptacle 410 secured thereon. In one implementation, insulative portion 406 of sacrificial interface 402 may include an outer shield 412 formed from, for example, EPDM.

As shown in FIGS. 4A and 4B, sacrificial receptacle 410 may be configured for releasable and replaceable attachment to yoke 102 following a sacrificial use, as described below. In one implementation, sacrificial receptacle 410 may be based on a non-sacrificial receptacle re-purposed from other products (e.g., 200 Amp deadbreak equipment, etc.). In this manner, a cost savings in manufacturing sacrificial receptacle 410 may be realized.

Sacrificial receptacle 410 may include an EPDM outer shield 414 and an insulative inner housing 416, typically molded from an insulative rubber or epoxy material. Sacrificial receptacle 410 may further include a conductive or semiconductive insert 418 having a bore formed therethrough. As shown, semi-conductive insert 418 may be configured to receive and surround a sacrificial conductor 420 therein. Furthermore, a forward portion of sacrificial receptacle 410 may include a cavity 422 therein for engaging a rearward portion of sacrificial interface 402.

A forward portion of outer shield 414 and inner housing 416 may be configured to surround and protect an interface between sacrificial interface 402 and sacrificial conductor 420. In one implementation, a forward end of outer shield 414 and inner housing 416 may be configured to frictionally engage the stepped outer configuration of sacrificial interface 402 upon assembly of splicing connector 400, thereby ensuring the electrical integrity of splicing connector 400.

Consistent with implementations described herein, sacrificial conductor 420 may include a conductive threaded male protrusion 424 extending axially therefrom in a forward direction. A rearward portion of sacrificial interface 402 may include a correspondingly threaded female cavity 426 for conductively securing sacrificial interface 402 to sacrificial conductor 420, thereby connecting sacrificial conductor 420 to central conductor 106 of yoke 102. In other implementations, the male/female relationship may be reversed.

A rearward portion of sacrificial receptacle 410 (e.g., the rearward end of the bore semi-conductive insert 418) may be configured to receive an insulative plug 428 therein. As described above, in some implementations, sacrificial receptacle 410 may be re-purposed from an existing receptacle in which the rearward end of the bore is configured for receiving a power cable or other element therein. Because sacrificial receptacle 410 does not connect to a power cable, insulative plug 428 may be provided to effectively seal the opening within the rearward end of sacrificial receptacle 410.

In one implementation, a cut-through region 430 may be provided in an outer surface of sacrificial receptacle 410 in a region overlying at least a portion of sacrificial conductor 420. In some implementations, cut-through region 430 may be provided with indicia for indicating that a user is to cut through sacrificial receptacle 410 at cut-through region 430.

When it is necessary for work to be performed on any of power cables 104 (or devices connected to power cables 104), a worker may cut through sacrificial receptacle 410 at cut-through region 430 (e.g., with a grounded hydraulic cable cutter, or similar tool) to ensure that the electrical system that splicing connector 400 is connected to has been properly de-energized and is, therefore, safe to work on. When it is time to re-energize splicing connector 400, the cut-through sacrificial receptacle 410 may be removed and a new or replacement sacrificial receptacle 410 may be installed.

FIGS. 5A and 5B are cross-section and side views, respectively, of an alternative sacrificial appendage 500 used as an alternative to sacrificial receptacle 410 of FIGS. 4A and 4B. Unlike the embodiment of FIGS. 4A and 4B, sacrificial appendage 500 is not a re-purposed cable receptacle or interface element.

As in the embodiment of FIGS. 4A and 4B, insulative portion 406 of sacrificial interface 402 may include a stepped outer configuration for sealingly receiving sacrificial appendage 500 secured thereon. Sacrificial appendage 500 may be configured for releasable and replaceable attachment to yoke 102 following a sacrificial use, as described below.

Sacrificial appendage 500 may include an EPDM outer shield 505 and an insulative inner housing 510, typically molded from an insulative rubber or epoxy material. Sacrificial appendage 500 may further include a sacrificial conductor 515 received within a rearward portion of inner housing 510. Furthermore, a forward portion of sacrificial appendage 500 may include a cavity 520 therein for engaging a rearward portion of sacrificial interface 402.

A forward portion of outer shield 505 and inner housing 510 may be configured to surround and protect an interface between sacrificial interface 402 and sacrificial conductor 515. In one implementation, a forward end of outer shield 505 and inner housing 510 may be configured to frictionally engage the stepped outer configuration of sacrificial interface 402 upon assembly of splicing connector 400, thereby ensuring the electrical integrity of splicing connector 400.

Consistent with implementations described herein, sacrificial conductor 515 may include a conductive threaded male protrusion 525 extending axially therefrom in a forward direction relative to a remainder of sacrificial conductor 515. As described above, rearward portion of sacrificial interface 402 may include threaded female cavity 426 for conductively securing sacrificial interface 402 to male protrusion 525 of sacrificial conductor 515, thereby connecting sacrificial conductor 515 to central conductor 106 of yoke 102. In other implementations, the male/female relationship may be reversed.

In one implementation, a cut-through region 530 may be provided in a rearward portion of sacrificial appendage 500 in a region overlying at least a portion of sacrificial conductor 515. In some implementations, indicia relating to cut-through region 530 may be provided on a surface of outer housing 515 for indicating that a user is to cut through sacrificial appendage 500 at cut-through region 530.

When it is necessary for work to be performed on any of power cables 104 (or devices connected to power cables 104), a worker may cut through sacrificial appendage 500 at cut-through region 530 (e.g., with a grounded hydraulic cable cutter, or similar tool) to ensure that electrical the system that splicing connector 400 is connected to has been properly de-energized and is, therefore, safe to work on. When it is time to reenergize splicing connector 400, the cut-through sacrificial appendage 500 may be removed and a new or replacement sacrificial appendage 500 may be installed.

Figure 6A:
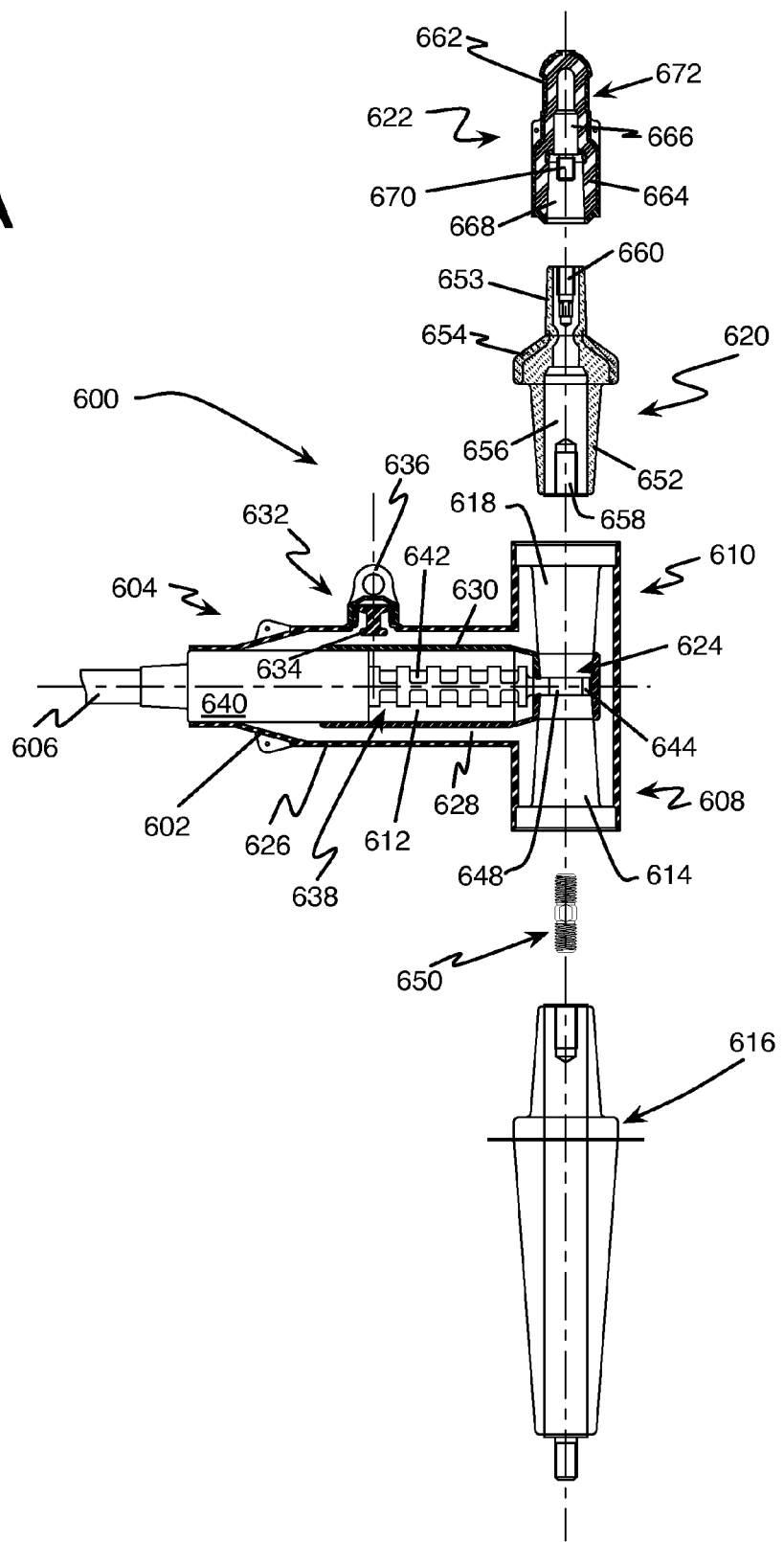
FIG. 6A is a schematic, exploded, cross-sectional diagram illustrating a power cable elbow connector consistent with implementations described herein.

FIG. 6A is a schematic, exploded, cross-sectional diagram illustrating a power cable elbow connector 600 consistent with implementations described herein. FIG. 6A is an unassembled or exploded view of power cable elbow connector 600. As shown, power cable elbow connector 600 may include a main housing body 602 that includes a conductor receiving end 604 for receiving a power cable 606 therein and first and second T-ends 608/610.

Conductor receiving end 604 may extend along a main axis of connector 600 and may include a bore 612 extending therethrough. First and second T-ends 608/610 may project substantially perpendicularly from conductor receiving end 604 in opposing directions from one another. For example, first T-end 608 is downwardly positioned and includes a bore 614 therein for receiving an equipment bushing 616, such as a deadbreak or loadbreak transforming bushing or other high or medium voltage terminal. Second T-end 610 is upwardly positioned and includes a bore 618 therein. As described in detail below, bore 618 in second T-end 610 is configured to receive a sacrificial adapter 620 and a sacrificial cap 622. A contact area 624 may be formed at the confluence of bores 612, 614, and 618.

Power cable elbow connector 600 may include an electrically conductive outer shield 626 formed from, for example, EPDM. Within shield 626, power cable elbow connector 600 may include an insulative inner housing 628, typically molded from an insulative rubber or epoxy material. Within insulative inner housing 628, power cable elbow connector 600 may include a conductive or semi-conductive insert 630 that surrounds the connection portion of power cable 606.

In one exemplary implementation, power cable elbow connector 600 may include a voltage detection test point assembly 632 for sensing a voltage in connector 600. Voltage detection test point assembly 632 may be configured to allow an external voltage detection device, to detect and/or measure a voltage associated with connector 600.

For example, as illustrated in FIG. 6A, voltage detection test point assembly 632 may include a test point terminal 634 embedded in a portion of insulative inner housing 628 and extending through an opening within outer shield 626. In one exemplary embodiment, test point terminal 634 may be formed of a conductive metal or other conductive material. In this manner, test point terminal 634 may be capacitively coupled to the electrical conductor elements (e.g., power cable 606) within connector 600.

A test point cap 636 may sealingly engage a portion of test point terminal 634 and outer shield 626. In one implementation, test point cap 636 may be formed of a semi-conductive material, such as EPDM. When test point terminal 634 is not being accessed, test point cap 636 may be mounted on test point assembly 632. Because test point cap 636 is formed of a conductive or semi-conductive material, test point cap 636 may ground test point terminal 634 when in position.

Conductor receiving end 604 of power cable elbow connector 600 may be configured to receive a prepared end of power cable 606 therein. For example, a forward end of power cable 606 may be prepared by connecting power cable 606 to a conductor spade assembly 638. More specifically, conductor spade assembly 638 may include a rearward sealing portion 640, a crimp connector portion 642, and a spade portion 644.

Rearward sealing portion 640 may include an insulative material surrounding a portion of power cable 606 about an opening of conductor receiving end 604. When conductor spade assembly 644 is positioned within connector body 602, rearward sealing portion 640 may seal an opening of conductor receiving end 604 about power cable 606.

Crimp connector portion 642 may include a substantially cylindrical conductive assembly configured to receive a center conductor (not shown) of power cable 606 therein. Crimp connector portion 642 may be crimped onto the center conductor prior to insertion of cable 606 into conductor receiving end 604.

Spade portion 644 may be conductively coupled to crimp connector portion 642 and may extend axially therefrom within bore 612. For example, in some implementations, spade portion 644 may be formed integrally with crimp connector portion 642 and be made of a conductive metal, such as steel, brass, aluminum, etc. As shown in FIG. 6A, spade portion 644 may include a bore 648 extending perpendicularly therethrough. Upon insertion of prepared cable 606 into power cable elbow connector 600, spade portion 644 may extend into contact area 624, with bore 648 aligned with bores 614 and 618 in first and second T-ends 608/610, respectively. Once spade portion 644 is seated within contact area 624, bore 648 may allow a threaded stud 650 or other coupling element (e.g., a pin, rod, bolt, etc.) to conductively couple spade portion 644 to bushing 616 and sacrificial adapter 620.

As briefly described above, bore 618 in second T-end 610 may be configured to receive sacrificial adapter 620 therein. As shown in FIG. 6A, sacrificial adapter 620 may include an insulative body portion 652 configured in a substantially conical shape for reception in bore 618 of second T-end 610. In addition, body portion 652 may include a cap-engaging portion 653 projecting axially upwardly from a remainder of body portion 652. Body portion 652 may include rubber, plastic, or some other non-conductive material. In some implementations, sacrificial adapter 620 may include a semi-conductive portion 654 formed over a portion of body portion 652 that is exposed following insertion of sacrificial adapter 620 into bore 618 and placement of sacrificial cap 622 on sacrificial adapter, as described below. Semi-conductive portion 654 may be formed of EPDM and may provide a continuous grounding surface for power cable elbow connector 600 following assembly thereof.

As shown, sacrificial adapter 620 also includes a conductive core portion 656 embedded within body portion 652 and extending axially therein through cap-engaging portion 653. Core portion 656 may be formed of any suitable conductive material, such as copper, aluminum, etc. Sacrificial adapter 620 may include a first threaded opening 658 for receiving threaded stud 650 therein to create a conductive pathway between power cable 606 and sacrificial adapter 620.

Figure 6B:
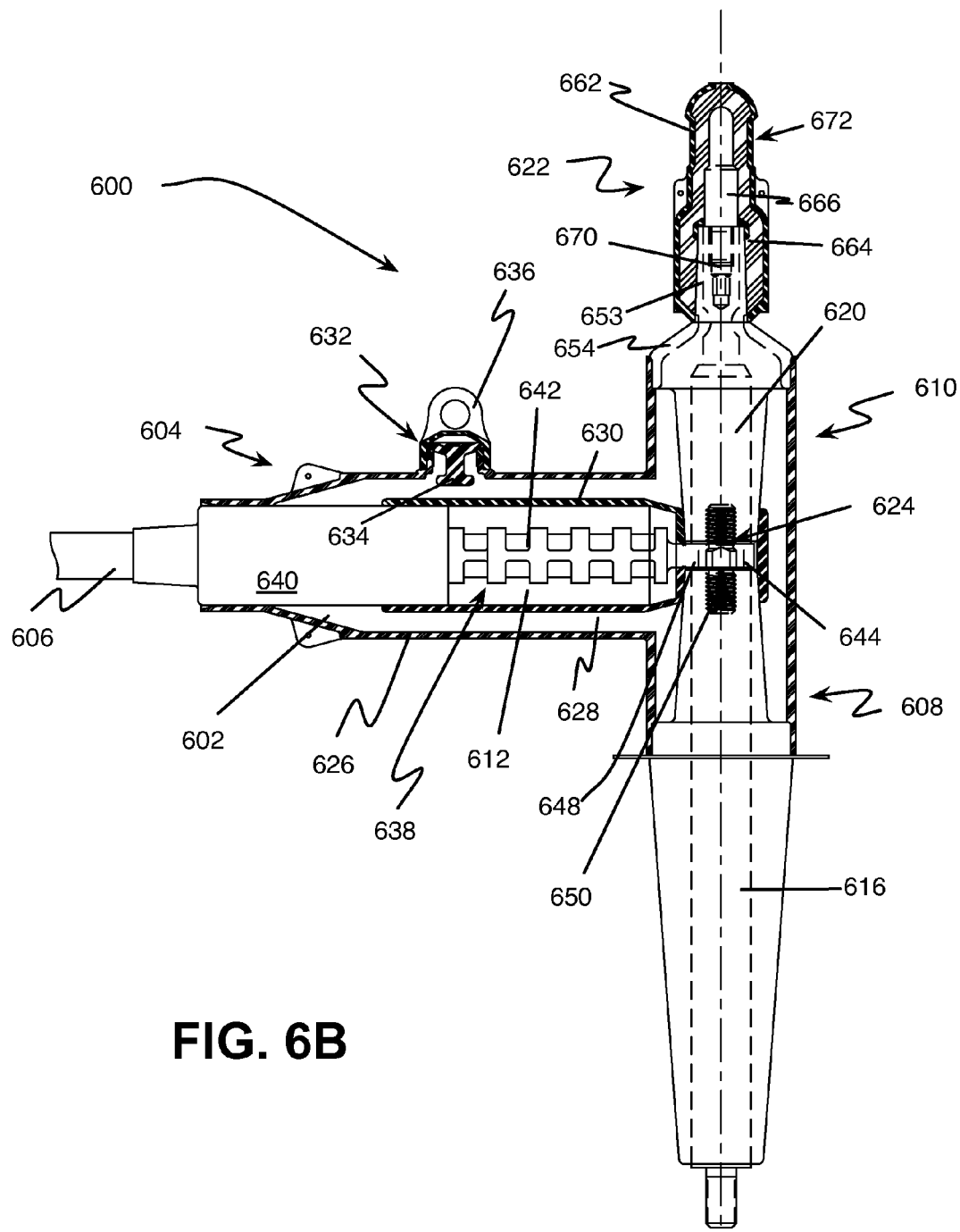
FIG. 6B is a schematic, cross-sectional diagram illustrating the power cable elbow connector of FIG. 6A in an assembled configuration.

During assembly, as shown in FIG. 6B, threaded stud 650 is initially threaded into a threaded opening in bushing 615 via bore 648 in spade portion 644. Sacrificial adapter 620 is then inserted into bore 618 in second T-end 610 and rotated to secure stud 650 into first threaded opening 658 in sacrificial adapter 620.

As shown in FIG. 6B, following attachment to stud 650, sacrificial adapter 620 may be seated within second T-end 610 of connector 600, such that only semi-conductive portion 654 is exposed above opening 618.

Figure 7A:
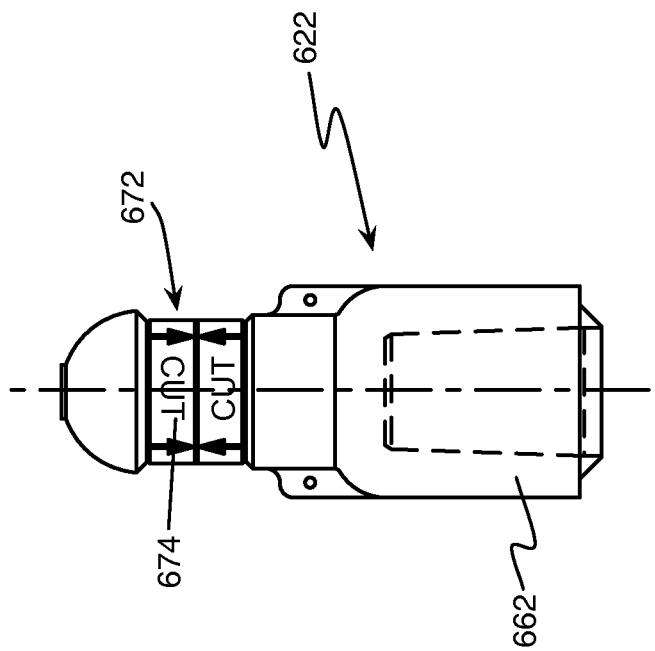
FIG. 7A is a schematic, cross-sectional diagram illustrating the sacrificial cap of FIGS. 6A and 6B.
Figure 7B:
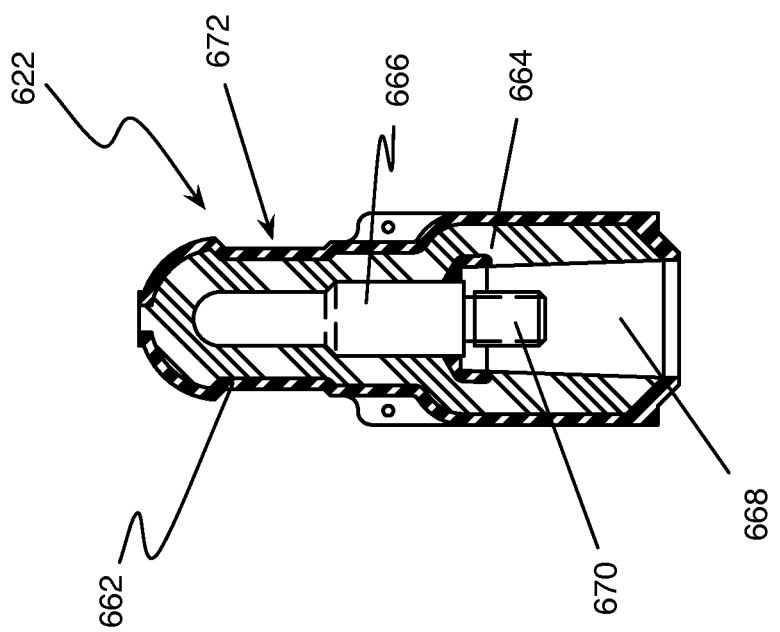
FIG. 7B is a side view of the sacrificial cap of FIG. 7A.

Returning to FIG. 6A, conductive core portion 656 of sacrificial adapter 620 also includes a second threaded opening 660 within cap-engaging portion 653 for receiving a conductive portion sacrificial cap 622. FIGS. 7A and 7B are cross-sectional and side views, respectively, of an exemplary sacrificial cap 622. As shown, sacrificial cap 622 may include an EPDM outer shield 662 and an insulative inner housing 664, typically molded from an insulative rubber or epoxy material. Sacrificial cap 622 also includes a sacrificial conductor 666 embedded within a portion of housing 664. As shown sacrificial cap 622 may include a generally cylindrical cavity 668 therein for receiving cap-engaging portion 653 of sacrificial adapter 620.

Consistent with implementations described herein, a portion of sacrificial conductor 666 may include a conductive threaded male protrusion 670 extending axially therefrom. Male protrusion 670 of sacrificial conductor 666 may be threadingly received in second threaded opening 660 during assembly, thereby conductively coupling sacrificial cap 622 to power cable 606. In other implementations, the male/female relationship may be reversed.

In one implementation, a cut-through region 672 may be provided in a portion of sacrificial cap 622 in a region overlying at least a portion of sacrificial conductor 666. In some implementations, indicia 674 relating to cut-through region 672 may be provided on a surface of outer shield 662, as shown in FIG. 7B, for indicating that a user is to cut through sacrificial cap 622 at cut-through region 672.

When it is necessary for work to be performed on power cable 606 (or devices connected to power cable 606), a worker may cut through sacrificial cap 622 at cut-through region 668 (e.g., with a grounded hydraulic cable cutter, or similar tool) to ensure that the electrical system that connector 600 is connected to has been properly de-energized and is, therefore, safe to work on. When it is time to reenergize connector 600, the cut-through sacrificial cap 622 may be removed and a new or replacement sacrificial cap 622 may be installed.

By providing an effective and safe mechanism for establishing demonstrative evidence of a de-energized system/circuit in an electrical connector, various personnel may be more easily able to safely identify and confirm a de-energized condition in a switchgear assembly. More specifically, consistent with aspects described herein, personnel may be able to create and view a physical disconnect of a connected portion of the electrical system without damaging (and necessarily replacing) connected power cables or other components.

The foregoing description of exemplary implementations provides illustration and description, but is not intended to be exhaustive or to limit the embodiments described herein to the precise form disclosed. Modifications and variations are possible in light of the above teachings or may be acquired from practice of the embodiments. For example, implementations described herein may also be used in conjunction with other devices, such as high voltage switchgear equipment, including 15 kV, 25 kV, or 35 kV equipment.

For example, various features have been mainly described above with respect to electrical splicing connectors and power cable elbow connectors. In other implementations, other medium/high voltage power components may be configured to include the sacrificial appendage/adapter configurations described above.

Although the invention has been described in detail above, it is expressly understood that it will be apparent to persons skilled in the relevant art that the invention may be modified without departing from the spirit of the invention. Various changes of form, design, or arrangement may be made to the invention without departing from the spirit and scope of the invention. Therefore, the above-mentioned description is to be considered exemplary, rather than limiting, and the true scope of the invention is that defined in the following claims.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. An electrical connector assembly, comprising:
a housing body that includes:
a cable receiving end having a first bore extending therethrough for receiving a power cable having a conductor;
a first T-end projecting perpendicular to the cable receiving end and including a second bore extending therethrough that communicates with the first bore in the cable receiving end, and
a second T-end projecting perpendicular to the cable receiving end and including a third bore extending therethrough that communicates with the first bore in the cable receiving end and the second bore in the first T-end;
an adapter component configured for insertion into the third bore in the second T-end,
wherein the adapter component includes an insulated outer body and a conductive core configured to conductively communicate with the conductor of the power cable; and
a sacrificial cap configured for placement on the adapter component,
wherein the sacrificial cap includes an insulated outer body and a sacrificial conductor configured to conductively communicate with the conductive core of the adapter component, and
wherein the sacrificial cap is configured to be cut to confirm that the electrical connector is de-energized.

2. The electrical connector of claim 1, wherein the power cable comprises a spade portion for connecting to the power cable conductor,
wherein the spade portion includes a bore extending therethrough.

3. The electrical connector of claim 2, wherein the power cable further comprises:
a crimp connector coupled to the power cable conductor,
wherein the crimp connector is configured for securing the conductor to the spade portion.

4. The electrical connector of claim 2, further comprising:
a conductive stud for coupling the adapter component to the spade portion.

5. The electrical connector of claim 4, wherein the conductive stud couples a bushing assembly to the electrical connector via the second bore in the first T-end.

6. The electrical connector of claim 1, wherein the third bore in the second T-end comprises a substantially conical configuration and wherein at least a portion of the sacrificial adapter includes a conical outer surface for mating with the second bore.

7. The electrical connector of claim 1, wherein at least a portion of the adapter component includes a semi-conductive outer shield.

8. The electrical connector of claim 7, wherein the at least a portion of the adapter component comprises a ethylene-propylene-dienemonomer (EPDM) shield.

9. The electrical connector of claim 1, wherein the adapter component includes a cap engaging portion for engaging the sacrificial cap, wherein the conductive core of the adapter component extends through the cap engaging portion.

10. The electrical connector of claim 9,
wherein the conductive core in the cap engaging portion includes a first cavity therein,
wherein the outer body of the sacrificial cap comprises a second cavity for receiving the cap engaging portion of the adapter component,
wherein a portion of the sacrificial conductor in the sacrificial cap projects within the second cavity, and
wherein the portion of the sacrificial conductor is received within the first cavity the conductive core in the cap engaging portion during placement of the sacrificial cap on the cap engaging portion of the adapter component.

11. The electrical connector of claim 10, wherein the first cavity comprises a threaded cavity and wherein the portion of the sacrificial conductor that projects within the second cavity comprises a threaded protrusion configured to mate with the threaded cavity.

12. The electrical connector of claim 1, wherein the sacrificial cap comprises a cut-through portion that includes at least a portion of the sacrificial conductor.

13. The electrical connector of claim 12, wherein the outer body of the sacrificial cap comprises graphical indicia indicating a location of the cut-through portion.

14. The electrical connector of claim 1, wherein the sacrificial cap is removeable from the adapter component.

15. A method, comprising:
providing an electrical elbow connector having a sacrificial component conductively connected to a T-end of the electrical elbow connector,
wherein the sacrificial component comprises:
an adapter component inserted into the T-end and conductively coupled to a power cable installed within the electrical elbow connector and;
a sacrificial cap secured to an exposed end of the adapter component and including a sacrificial conductor embedded therein conductively coupled to the power cable via the adapter component;
cutting through the sacrificial cap and sacrificial conductor to confirm that the electrical elbow connector is de-energized;
performing service on equipment conductively coupled to the electrical elbow connector;
removing the sacrificial cap from the adapter component; and
installing a replacement sacrificial cap onto the adapter component.

16. The method of claim 15, wherein the sacrificial cap comprises an insulative outer body, wherein the sacrificial conductor is enclosed within the insulative outer body, wherein cutting through the sacrificial cap further comprises:
cutting through the outer body in a region overlying the sacrificial conductor.

17. The method of claim 15, wherein an exposed portion of the adapter component between the T-end and the sacrificial cap comprises a semi-conductive outer shield.

18. A medium or high voltage electrical connector assembly, comprising:
a connector body for receiving a power cable and having at least one T-end having a bore therein;
an adapter configured to be received within the bore in the at least one T-end,
wherein the adapter comprises a conductive core coupled to the power cable; and
a sacrificial cap configured to engage a portion of the adapter extending from the at least one T-end,
wherein the sacrificial cap comprises a sacrificial conductor coupled to the conductive core of the adapter and configured to be cut through to confirm that the electrical connector assembly has been de-energized.

19. The medium or high voltage electrical connector assembly of claim 18, wherein the sacrificial cap is removeable from the adapter.

20. The medium or high voltage electrical connector assembly of claim 18, wherein the bore in the at least one T-end comprises a substantially conical configuration and wherein at least a portion of the adapter includes a conical outer surface for mating with the bore.

* * * * *